United States Patent

Acheson et al.

[11] 4,202,169
[45] May 13, 1980

[54] SYSTEM FOR COMBUSTION OF GASES OF LOW HEATING VALUE

[75] Inventors: Willard P. Acheson, Pittsburgh, Pa.; Richard A. Morris, Missouri City, Tex.; Thiagarajan Viswanathan, Allison Park, Pa.

[73] Assignee: Gulf Research & Development Company, Pittsburgh, Pa.

[21] Appl. No.: 930,557

[22] Filed: Aug. 3, 1978

Related U.S. Application Data

[63] Continuation-in-part of Ser. No. 791,850, Apr. 28, 1977, abandoned, and a continuation-in-part of Ser. No. 925,703, Jul. 18, 1978.

[51] Int. Cl.$^2$ .............................. F02C 3/22; F02C 7/22
[52] U.S. Cl. ........................... 60/39.12; 60/39.14 M; 60/723
[58] Field of Search ................ 60/39.02, 39.06, 39.12, 60/39.46 G, 39.69 A, 39.82 C; 431/7

[56] References Cited

U.S. PATENT DOCUMENTS

| | | | |
|---|---|---|---|
| 2,624,172 | 1/1953 | Houdry | 60/39.46 K |
| 3,113,620 | 12/1963 | Hemminger | 166/259 |
| 3,928,961 | 12/1975 | Pfefferle | 60/39.06 |

OTHER PUBLICATIONS

McCrank et al., *Power Generation from Shale Oil Off-Gas*, ASME paper presented Sep. 1976.
DeCorso et al., *Catalysts for Gas Turbine Combustions—Experimental Test Results*, ASME paper presented Mar. 1976.

*Primary Examiner*—Louis J. Casaregola

[57] ABSTRACT

A gas turbine system for the recovery of power from fuel gases having a low heating value, i.e., below about 80 Btu/scf, and usually in the range of 35 to 70 Btu/scf, has an external catalytic combustor. The catalytic combustor is divided into a primary and a secondary catalytic combustion chamber with a heat exchanger between the two combustion chambers. In the preheater the low heating value gas mixed with combustion air is passed in indirect heat exchange with products of combustion from the first combustion chamber before the low heating value gas is delivered to the first combustion chamber. The turbine system is particularly advantageous in recovering power from low heating value gas in which the combustibles are hydrocarbons, primarily methane.

16 Claims, 2 Drawing Figures

SYSTEM FOR COMBUSTION OF GASES OF LOW HEATING VALUE

This application is a continuation-in-part of our U.S. application Ser. No. 791,850, filed Apr. 28, 1977 entitled Power Recovery Process, now abandoned, and of U.S. application Ser. No. 925,703, filed July 18, 1978, entitled Method for the Recovery of Power from LHV Gas.

BACKGROUND OF THE INVENTION

1. Field of the Invention

This invention relates to the recovery of power from gas of low heating value and more particularly to a gas turbine system adapted to utilize such gas to generate power.

2. Description of the Prior Art

One method for increasing the production of heavy crude oils of high viscosity from underground formations is the in-situ combustion process. In that process, air is injected at a high pressure through an injection well into the underground formation containing the heavy oil. The oil in the formation is ignited adjacent the injection well by any of several known procedures such as the procedure disclosed in U.S. Pat. No. 3,172,472 of F. M. Smith. Injection of air is continued after ignition to burn part of the oil in the formation and to increase the pressure in the formation adjacent the injection well and thereby drive oil in the formation toward a production well spaced from the injection well. A typical in-situ combustion process is described in U.S. Pat. No. 2,771,951 of Simm. The heat released by combustion of some of the oil in the formation heats the formation and oil whereby the viscosity of the oil is greatly reduced by the high temperature, cracking of the oil, and by solution in the oil of low molecular weight hydrocarbons formed by the cracking. The reduced viscosity and the pressure of the injected gases cause the oil to flow through the underground reservoir to a production well.

During in-situ combustion processes, the combustion front at which oil in the formation is burned does not move radially outwardly from the injection well at a uniform rate in all directions. Some of the injected air fingers through zones of high permeability in the formation toward a production well and combustion occurs at the boundaries of the fingers. There is usually a breakthrough of combustion products in the nature of a flue gas long before the production of oil by the in-situ process is completed. Volatile constituents in the oil, or formed by cracking of the oil, are entrained in the injected air of flue gases and carried by them to the production well. All of these factors contribute toward a nonuniformity in the composition and heating value of the gas produced.

The fluids produced at the production well are separated into liquid petroleum products which are delivered to storage or a delivery line and gaseous products. The gaseous products customarily have been vented to the atmosphere. The gaseous products hereinafter referred to as LHV gas, from in-situ combustion of heavy petroleum contain low concentrations of methane and $C_2$–$C_6$ hydrocarbons, as well as nitrogen, carbon dioxide, sulfur compounds such as hydrogen sulfide, mercaptan and carbonyl sulfide, and in some instances a small amount of carbon monoxide. Those gaseous products constitute low heating value fuel capable of supplying a substantial part of the energy required to compress the air for injection into the subsurface formation at the injection well. The shortage of natural gas makes it important that the energy in the production from an in-situ combustion process be fully utilized. Moreover, tightening of laws relating to pollution of the atmosphere has placed stringent limitations on the amount of carbon monoxide, the sulfur compounds most frequently present in the gaseous products and hydrocarbons other than methane that may be discharged into the atmosphere.

U.S. Pat. No. 3,113,620 of Hemminger describes a single well in-situ combustion process in which a cavity filled with rubble is formed in a subsurface oil shale deposit by means of a nuclear explosion. An in-situ combustion process in the cavity is then conducted to remove oil from the rock, aid in draining the oil into a pool in the bottom of the cavity, and force the oil up the well to the surface. The gas produced with the oil in the in-situ combustion of oil shale contains a higher concentration of carbon monoxide than gas produced in a conventional in-situ combustion process in an oil reservoir. Because gas produced from oil shale has a high concentration of carbon monoxide and hydrogen as compared to the off-gas from in-situ combustion in petroleum reservoirs, the off-gas from oil shale may in some instances be burned directly in a flame combustor of a gas turbine used to drive an air compressor.

In a paper entitled "Power Generation from Shale Oil Process Off-Gas" by J. M. McCrank and G. R. Short presented at the IEEE-ASME Joint Power Generation Conference in Buffalo, N.Y., Sept. 19–22, 1976, the results of an engineering study of generation of power from the off-gas from the in-situ combustion of oil shale are described. Off-gas from the oil shale is burned in a flame-type combustion to produce hot products of combustion used to drive a gas turbine. As indicated above, the high concentration of carbon monoxide in the off-gas from the in-situ retorting of oil shale facilitates flame combustion but variations in the composition of the off-gas could make maintenance of a stable flame uncertain.

A paper entitled "Catalysts for Gas Turbine Combustors- Experimental Test Results" by S. M. DeCorso, S. Mumford, R. Carrubba and R. Heck, presented at the Mar. 21–25, 1976 meeting of The American Society of Mechanical Engineers describes the burning of a fuel described as a low heating value gas in a laboratory catalytic combustion chamber. The low heating value gas is further identified as synthetic coal gas heat having a heating value of 126 Btu/scf. The combustion was accomplished by passing in contact with the catalyst a mixture of the gas and air preheated to a temperature whereby catathermal combustion of the type described in U.S. Pat. No. 3,928,961 of Pfefferle occurs. In that process, the mixture of fuel and air near the catalyst surface is at a temperature at which thermal combustion occurs at a rate higher than the catalytic rate and the catalyst surface is above the instantaneous autoignition temperature of the fuel-air mixture.

BRIEF SUMMARY OF THE INVENTION

This invention resides in a system for the recovery of power from low heating value gas (LHV gas) such as is produced in an in-situ combustion process for the recovery of petroleum of an in-situ combustion process for the retorting of oil shale. The LHV gas is mixed with air and heated to a temperature at which combustion of the LHV gas will be initiated on contact with an oxidation catalyst. The system includes a gas turbine having an external combustor which includes a first and a second stage catalytic combustion chamber with a heat exchanger between the combustion chambers. The mixture of air and gas is passed through the heat exchanger before delivery to the first stage catalytic combustion chamber jand is there heated by indirect heat exchange with products of combustion discharged from the first stage catalytic combustion chamber. Means are provided to control the rate of flow of the air to limit the maximum temperature rise and thereby avoid excessive temperatures in the external catalytic combustion chamber by maintaining a substoichiometric flow of air into the combustor.

DESCRIPTION OF PREFERRED EMBODIMENT

Figure 1:
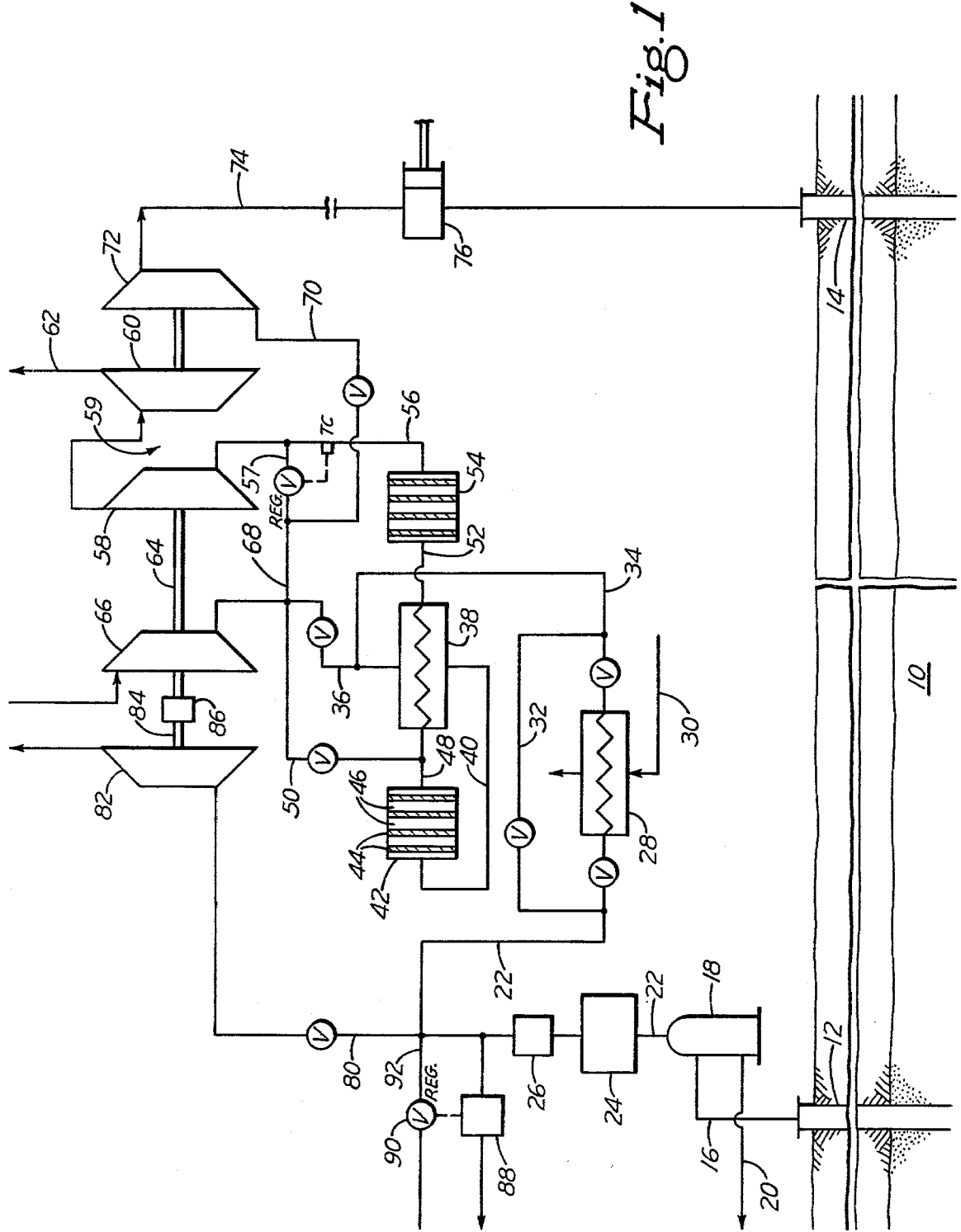
FIG. 1 is a diagrammatic view of a system for recovering power from LHV gas from an in-situ combustion process for the production of petroleum in which the LHV gas is supplied at a pressure high enough to drive a turbine.

Referring to FIG. 1 of the drawings, a subsurface oil reservoir 10 containing crude oil, usually of high density and viscosity, is penetrated by a production well 12 and an injection well 14 spaced from the production well. Fluids produced from the production well 12 are delivered through a line 16 into a separator 18 in which the produced LHV gas is separated from liquids produced through well 12. The liquids are discharged from the lower end of the separator 18 into a delivery line 20 and the LHV gas is discharged from the top of separator 18 into a feed line 22. It will usually be desirable to pass the gas from the separator 18 through a suitable gas clean-up, indicated by 24, to remove solid particulates, catalyst poisons, or other undesirable constituents before delivery into the power recovery system. It is important to efficient operation of a gas turbine that variations in the mass flow of gas to the turbine be reduced to a minimum. A flow controller 26 maintains a constant flow rate of the LHV gas into the system.

Typical hydrocarbon concentrations in the LHV gas range from about 1 to 8 percent by volume. The hydrocarbons are principally methane; the concentration of $C_2-C_6$ hydrocarbons usually being less than 2 percent. The heating value of the LHV gas produced from in-situ combustion in oil reservoirs may range from 5 to 80 Btu/scf, and ordinarily will be in the range of 35 to 70 Btu/scf, a range in which this process is particularly useful. With the concentrations of hydrocarbons usually present in LHV gas produced by in-situ combustion in oil reservoirs, stable combustion of methane and the other low molecular weight hydrocarbons produced in in-situ production cannot be obtained in the absence of an oxidation catalyst, but is obtained only in the presence of a catalyst. LHV gas having a heating value above 15 Btu/scf can be burned in a catalytic combustor without an external source of heat. If other sources of heat are available to provide additional preheat, LHV gas having a heating value as low as 5 Btu/scf can be oxidized in catalytic combustion chambers.

For most effective use in driving a gas turbine to compress air used in the in-siter combustion process, for example, the gases discharged from the separator 18 should be at a pressure of at least 75 psig. If the gas is at lower pressure, part of the energy produced by the gas turbine is used in compressing the LHV gas to a pressure high enough to drive a turbine, as is described with reference to FIG. 2. The pressure in the production wells of an in-situ combustion process in an oil reservoir may range from slightly above atmospheric pressure to 800 psig. The pressure is dependent, at least in part on the depth of the formation in which the combustion occurs. Pressures higher than 800 psig in the production wells could be used but such high pressures suffer the disadvantage of high costs for compressing the air injected into the underground formation.

During startup of the gas turbine, LHV gas is delivered through line 22 into a preheater 28 in which the gas is heated to a temperature such that when the LHV gas mixed with air contacts the catalyst, combustion of the LHV gas will occur. The preheater is heated by a fuel such as natural gas, propane, or LPG supplied through line 30. If desired, combustion air for the combustion in the first stage catalytic combustion chamber, hereinafter described, can be mixed with LHV gas before the LHV gas is passed through the preheater 28. The mixture of air and LHV gas delivered to the catalytic combustion chamber should be at a temperature of at least 400 °F., and preferably 600 °F. to 800 °F., to initiate combustion. The preheater is used only during the startup. After first-stage catalytic combustion is initiated, LHV gas bypasses preheater 28 through bypass 32 and valves at the inlet and outlet of the preheater are closed.

In the embodiment illustrated in FIG. 1, LHV gas from the preheater 28 during startup, or from bypass 32 thereafter, is delivered into a line 34 in which it is mixed with primary combustion air supplied through a first combustion air line 36. The mixture is delivered to a heat exchanger 38 where it passes in indirect heat exchange with hot products of combustion from the first stage catalytic combustion chamber, as hereinafter described, to heat the mixture to a temperature above about 400 °F., preferably 600 °F. to 800 °F. at which combustion is initiated on contact with the catalyst. The heated mixture of LHV gas and air is delivered from heat exchanger 38 through line 40 into the inlet end of the primary catalytic combustion chamber 42. In a preferred structure, catalytic combustion chamber 42 has a plurality of spaced-apart permeable discs 44 arranged transversely of the combustion chamber on which a catalytically active metal from the platinum group is deposited. The spaces 46 between the discs allow remixing of the products of combustion from the discs to prevent the development of hot spots in the catalyst.

The discs 44 are preferably of a ceramic material of honeycomb or other configuration having passages extending from the inlet face to the opposite face of the discs to permit passage of gases longitudinally through the primary combustion chamber 42. Typical catalysts that can be used are described in U.S. Pat. No. 3,870,455 of Hindin and U.S. Pat. No. 3,565,830 of Keith et al. This invention is not restricted to the use of a particular catalyst support or a particular catalytic material. Other oxidation catalysts, such as cobalt, lanthanium, palladium, rhodium, nickel, iron, on other types of supports, such as granules, saddles or rings of refractory materials, can be used.

The products of combustion from the primary catalytic combustion chamber are discharged at about 1600° F. through line 48 and delivered into heat exchanger 38 for heat transfer with the LHV-gas-in-air mixture supplied through line 36. Heat exchanger 38 is preferably a tube and shell-type heat exchanger with the hot products of combustion passing through the tubes and the LHV gas-air mixture passing over the outer wall of the tubes and through the space between such outer wall and the shell of the exchanger. In the preferred embodiment of the invention, secondary air for the combustion in a secondary catalytic combustion chamber 54 of unburned combustible material in the products of combustion discharged from combustion chamber 42 is delivered through a line 50 into line 48 in which the air is mixed with the products of combustion discharged from combustion chamber 42 before delivery into the preheater 38. The mixing of secondary air with the effluent from the primary combustion chamber 42 ordinarily lowers the temperature approximately 200° F.

Hot combustible gas mixed with secondary air is delivered at a temperature of 400° F. to 800° F., preferably 600° F. to 800° F., from heat exchanger 38 through line 52 into the inlet end of the secondary catalytic combustion chamber 54. Secondary catalytic combustion chamber 54 is preferably similar to combustion chamber 42. Combustible compounds remaining in the products discharged from combustion chamber 42 are oxidized in combustion chamber 54 and discharged from that combustion chamber into a hot gas line 56.

Combustion of combustible compounds principally hydrocarbons, in the LHV gas releases heat that raises the temperature of the gases in the combustion chamber to a temperature that does not exceed the maximum permissible operating temperature of the catalyst. Preferred catalysts now available commercially have a maximum operating temperature of approximately 1600° F. The catalysts can be operated at higher temperatures, but higher temperatures shorten the life of the catalyst. Control of the temperature in catalytic combustion chamber 42 is obtained by limiting the amount of air supplied to the combustion chamber to an amount that if completley consumed in the combustion will limit the temperature rise to the desired range. Combustion in combustion chamber 42 is always with an amount of air less than the stoichiometric equivalent of the combustibles in the LHV gas. Control of the combustion of the LHV gas by control of the amount of air supplied to the combustion chambers to an amount less than the stoichiometric equivalent of the combustibles in the LHV gas makes the maximum temperature independent of the heating value of the LHV gas. Variations in the heating value of the gas cannot cause excessive catalyst temperatures. The avoidance of excessive temperatures by maintaining an air flow rate to the catalytic combustion chambers that will limit the maximum temperature rise regardless of the heating value of the LHV gas is described and claimed in our U.S. application Ser. No. 791,850, filed Apr. 28, 1977, entitled Power Recovery Process, now abandoned. The temperature limitations in the secondary combustion chamber 54 are the same as in primary combustion chamber 42. The maximum temperature rise in combustion chamber 54 is limited by limiting the amount of air supplied through line 50 to an amount that will be entirely consumed by burning combustibles that will raise the temperature to the desired maximum; consequently, a sudden increase in the heating value of the LHV gas will not result in excessive temperatures. Preferably, approximately one-half of the total combustion air is supplied to each of the combustion chambers.

Hot gas is delivered through line 56 into the inlet of a gas turbine indicated generally by reference numeral 59 in which the gas is expanded to drive the turbine and turn a drive shaft to provide power. If the hot gas in line 56 is at a temperature above the maximum operating temperature of the turbine, the gas is cooled to the desired temperature by dilution air supplied through line 57. In the absence of catalyst, dilution air will not cause burning of combustibles in the hot gas. In the embodiment of the invention illustrated in FIG. 1, the gas turbine 59 comprises two sections, a first section 58 and a second section 60. Expanded gas from section 58 is delivered into the inlet of second section 60 where further expansion occurs before the exhaust gas is discharged through a line 62 to the atmosphere.

Section 58 of the turbine drives shaft 64 to turn an air compressor 66. Compressed air from compressor 66 is discharged into a line 68 from which compressed air is delivered into lines 36, 50 and 57. Another portion of the compressed air from compressor 66 is bleed air delivered through a line 70 to an air compressor 72 driven by second section 60 of the gas turbine to provide air for the in-situ combustion process. Air discharged from air compressor 72 is delivered through a line 74 to an air compressor 76 for compression to a suitable pressure for injection into formation 10 for the in-situ combustion process.

In the operation of the apparatus illustrated in FIG. 1, LHV gas discharged from the flow control device 26 is delivered during startup through line 80 to a startup turbine 82. Startup turbine 82 is connected by shaft 84 having a suitable clutch 86 to air compressor 66. LHV gas discharged from the startup turbine 82 is exhausted to the atmosphere.

A portion of the LHV gas flow is delivered through line 22 into preheater 28 where it is heated by indirect heat transfer with hot combustion products from burning of a fuel 30. Air from compressor 66 is delivered through line 36 for admixture with the LHV gas from preheater 28 and the mixture passed through the heat exchanger 38. At the beginning of startup, no heating of the LHV gas-air mixture occurs in the heat exchanger. The hot LHV gas-air mixture flows into the primary combustion chamber 42 where the mixture first heats the catalyst to reaction temperature and then burns in a catalytic oxidation.

Hot combustion products discharged from catalytic combustion chamber 42 are mixed with secondary air supplied through line 50 and passed through heat exchanger 38 in indirect heat exchange with the LHV-air mixture to be delivered to the primary catalytic combustion chamber 42. The mixture of secondary air and partially burned LHV gas discharged from heat exchanger 38 is delivered through line 52 into the secondary catalytic combustion chamber 54 where additional combustion occurs. The combustion products discharged from secondary combustion chamber 54 are usually at a temperature of about 1600° F. That hot mixture is delivered through line 56 into gas turbine 58. Usually it is desirable to operate the gas turbine at a temperature of 1400° to 1550° F. Cooling of the hot gases in line 56 is accomplished by admixing those gases with dilution air supplied through line 57.

After combustion in primary combustion chamber 42 is initiated, the flow of LHV gas to preheater 28 is discontinued and LHV gas is supplied to line 34 through bypass 32. The rate of flow of LHV gas is gradually increased to bring the turbine 58 up to load.

As the gas turbine 58 takes over the load of compressor 66, clutch 86 is disengaged to isolate startup turbine 82 from compressor 66 and the valve in line 80 is closed to stop the flow of LHV gas to the startup turbine 82.

The variations in the composition of LHV gas produced in an in-situ combustion process from time to time may result in the heating value of the gas dropping to a level such that the temperature of the products discharged from secondary combustion chamber 54 is lower than the desired temperature. To maintain most efficient operation of the gas turbine, samples of LHV gas are taken from line 22 and passed through a hydrocarbon analyzer 88 for determination of the heating value of LHV gas. Hydrocarbon analyzers are readily available commercial devices. The analyzer 88 delivers a signal which is delivered to regulating valve 90 in an auxiliary fuel line 92. If the heating value of the LHV gas drops to a level at which the temperature of products discharged from the secondary combustion chamber is lower than desired, valve 90 supplies auxiliary fuel through line 92. The air supplied through lines 36 and 50 is sufficient to permit combustion adequate to increase the temperature to the desired level but is not sufficient for generation of excessive temperatures if the heating value of the LHV gas should suddenly increase. If the temperature in line 56 should fall below the desired temperature, a signal generated by temperature responsive means can be utilized to control the valve in line 50 to increase the secondary air.

Figure 2:
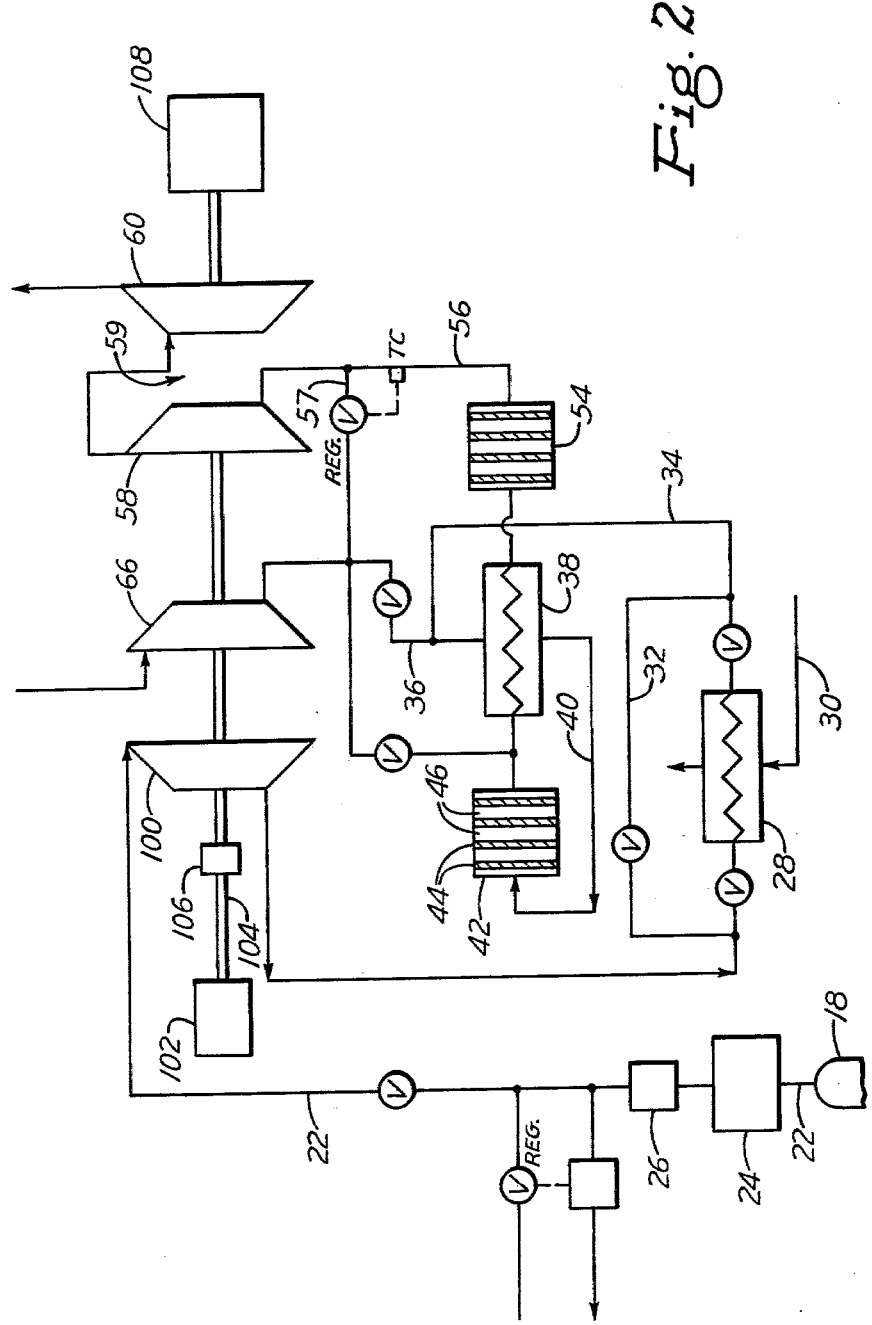
FIG. 2 is a diagrammatic view of a system for use in recovery of power from an LHV gas supplied at a low pressure.

The apparatus illustrated in FIG. 2 is for LHV gas that is initially supplied at a low pressure, as would ordinarily be produced in the in-situ combustion of oil shale. Since the LHV gas is at a pressure too low to drive a turbine efficiently, it is necessary to compress the LHV gas to a higher pressure that will allow efficient operation of the gas tubine. In general, an initial LHV gas pressure of at least 75 psig is required for effective utilization of a gas turbine. For this purpose an LHV gas compressor 100 is mounted on the same shaft as compressor 66. A starting prime mover 102, which may be a diesel engine, electric motor, etc., is adapted to drive LHV gas compressor 100 through a shaft 104. A clutch 106 allows disengagement of the starting motor 102 after the gas turbine 58 has been brought up to speed to drive the LHV gas compressor 100 and the compressor 66.

The apparatus illustrated in FIG. 2 is similar to that in FIG. 1 in the arrangement of the air compressor 66, external catalytic combustion chambers 42 and 54, heat exchanger 38 and gas turbine 59. Since it is necessary to compress the LHV gas as well as compress the air for combustion of the LHV gas, the amount of air compressed by compressor 66 may be adequate only for combustion of the LHV gas. There would then not be any air bled from compressor 66 to the suction of a compressor driven by section 60. Section 60 may, for example, drive an electric generator indicated by reference numeral 108.

The gas turbine herein described allows the recovery of power from gas fuels having a heating value too low for the usual gas turbine that uses flame combustion for burning the fuel. The catalytic combustor provides stable combustion of fuels having heating values well below the heating value of gases that will provide a stable flame and is particularly valuable in utilizing low heating value fuels in which the principal combustible material is methane, a fuel that is difficult to burn. The two-stage catalytic combustion chamber with a heat exchanger between the stages provides a self-contained unit that will raise the LHV gas-air mixture to catalytic oxidation temperatures without the use of an external heating source and avoids excessive catalyst temperatures. The apparatus is particularly valuable in utilizing gases from in-situ combustion processes for the production of oil.

We claim:

1. Apparatus for the recovery of power from LHV gas discharged from an in-situ combustion process comprising a gas turbine, an air compressor driven by the gas turbine, an external combustor for burning the LHV gas, said combustor comprising a first stage catalytic combustion chamber and a second stage catalytic combustion chamber, a heat exchanger between the first stage catalytic combustion chamber and the second stage catalytic combustion chamber connected to deliver products of combustion discharged from the first stage catalytic combustion chamber through the heat exchanger to the second stage catalytic combustion chamber, LHV gas conduit means to the heat exchanger for delivering the LHV gas from the in-situ combustion process to the heat exchanger, said heat exchanger being constructed and arranged for passing the LHV gas in indirect heat exchange with the products of combustion from the first stage catalytic combustion chamber, conduit means from the heat exchanger to the inlet of the first stage catalytic combustion chamber, said conduit means communicating through the heat exchanger with the LHV gas conduit means for delivery of LHV gas to the first stage catalytic combustion chamber, hot gas conduit means from the outlet of the second stage catalytic combustion chamber to the gas turbine for delivery of hot products of combustion to the gas turbine, and air conduit means from the air compressor connected for supplying compressed air to the LHV gas before entrance to the first stage catalytic combustion chamber and to gas delivered to the second stage catalytic combustion chamber.

2. Apparatus as set forth in claim 1 characterized by the air conduit means from the air compressor including a first line to the LHV gas conduit for supplying compressed primary combustion air to the LHV gas before the LHV gas is delivered to the heat exchanger.

3. Apparatus as set forth in claim 2 characterized by the air conduit means from the air compressor including a second line arranged to deliver air into the combustion products discharged from the first catalytic combustion chamber prior to entry of said combustion products into the heat exchanger.

4. Apparatus as set forth in claim 1 characterized by the heat exchanger being a tube and shell heat exchanger constructed and arranged to pass the combustion products through the tubes and to pass the LHV gas between the outer surface of the tubes and the shell.

5. Apparatus as set forth in claim 1 characterized by a cooling air line opening into the hot gas conduit means, hot gas temperature responsive signaling means in the hot gas conduit, and flow control means in the cooling air supply line responsive to a signal from the signaling means in the hot gas conduit for controlling the rate of flow of the cooling air to maintain the temperature of gas delivered to the turbine below a predetermined maximum.

6. Apparatus as set forth in claim 5 characterized by the cooling gas line extending from the outlet of the compressor to the hot gas conduit means.

7. Apparatus as set forth in claim 5 characterized by the flow control means in the cooling air line being constructed and arranged to increase the flow of cooling air in response to hot gas temperatures higher than a predetermined temperature, an auxiliary fuel line connected to deliver auxiliary fuel into the external combustor, means for monitoring the heating value of the LHV gas, and flow control means in the auxiliary fuel line responsive to the heating value of the LHV gas adapted to allow flow of auxiliary fuel when the heating value of the LHV gas drops below a predetermined minimum.

8. Apparatus as set forth in claim 7 characterized by the auxiliary fuel line opening into the LHV gas conduit means.

9. Apparatus as set forth in claim 6 characterized by a second air compressor driven by the gas turbine, an air line from the compressor outlet adapted to bleed to the second air compressor air in excess of that delivered from the compressor to the catalytic combustion chambers and to the hot gas line.

10. Apparatus as set forth in claim 9 characterized by the gas turbine having two sections, each of said sections driving a separate shaft, the air compressor being driven by one shaft, and the second air compressor being driven by the other shaft.

11. Apparatus as set forth in claim 3 characterized by temperature responsive signaling means in the hot gas conduit, and flow control means in the second air line responsive to the temperature responsive signaling means in the hot gas conduit adapted to increase the flow of air in the second line.

12. Apparatus as set forth in claim 1 characterized by the catalytic combustion chambers comprising a tubular chamber, a plurality of longitudinally spaced-apart discs of ceramic catalyst support extending transversely across the chamber, passages extending through the discs from one face thereof to the opposite face to permit longitudinal flow through the catalytic combustion chambers, and an oxidation catalyst deposited on the discs.

13. Apparatus as set forth in claim 7 characterized by the oxidation catalyst being platinum.

14. Apparatus as set forth in claim 1 characterized by an LHV gas compressor driven by the gas turbine, and said LHV gas conduit means including a line from the source of LHV gas to the LHV gas compressor inlet and a line from the LHV gas compressor outlet to the heat exchanger.

15. In a gas turbine for the recovery of power from LHV gas, the improvement comprising a catalytic combustor for burning the LHV gas to produce a hot gas for driving the gas turbine, said combustor comprising a primary catalytic combustion chamber and a secondary catalytic combustion chamber, said primary and secondary combustion chambers having a solid oxidation catalyst constructed and arranged therein for intimate contact with and low pressure drop in gas passing through the combustion chambers, a heat exchanger between the primary and secondary combustion chambers, conduit means from the primary combustion chamber to the heat exchanger and from the heat exchanger to the secondary combustion chamber constructed and arranged to deliver gas discharged from the primary combustion chamber into the heat exchanger and from the heat exchanger into the secondary combustion chamber, first LHV gas conduit means for delivering LHV gas into the heat exchanger for indirect heat exchange with the gas discharged from the primary combustion chamber, second LHV gas conduit means from delivering LHV gas from the heat exchanger to the inlet of the primary combustion chamber, air conduit means constructed and arranged to deliver air into the LHV gas before the LHV gas enters the primary combustion chamber and into the gas discharged from the primary combustion chamber before said gas enters the secondary combustion chamber, and a hot gas line from the outlet of the second combustion chamber to the gas turbine.

16. Apparatus as set forth in claim 1 characterized by an LHV gas compressor driven by the gas turbine and the LHV gas conduit means to the heat exchanger including a line from the in-situ combustion process to the inlet of the LHV gas compressor and a line from the outlet of the LHV gas compressor to the heat exchanger.

* * * * *

UNITED STATES PATENT OFFICE
CERTIFICATE OF CORRECTION

Patent No. 4,202,169            Dated May 13, 1980

Inventor(s) Willard P. Acheson, Richard A. Morris, Raymond J. Rennard and Thiagarajan Viswanathan It is certified that error appears in the above-identified patent and that said Letters Patent are hereby corrected as shown below:

Inventors:   Willard P. Acheson, Pittsburgh, Pa.;
                Richard A. Morris, Missouri City, Tex.;
                Thiagarajan Viswanathan, Allison Park, Pa.

should read:

Inventors:   Willard P. Acheson, Pittsburgh, Pa.;
                Richard A. Morris, Missouri City, Tex.;
                Raymond J. Rennard, Pittsburgh, Pa.;
                Thiagarajan Viswanathan, Allison Park, Pa.

Column 2, line 65, "of", second occurrence, should be --or--.

Column 3, line 7, "jand" should be --and--.

Column 3, line 67, "in-siter" should be --in-situ--.

Signed and Sealed this

Fifth Day of August 1980

[SEAL]

Attest:

SIDNEY A. DIAMOND

*Attesting Officer*        *Commissioner of Patents and Trademarks*